United States Patent
Tamasi et al.

(10) Patent No.: US 9,262,837 B2
(45) Date of Patent: Feb. 16, 2016

(54) PCIE CLOCK RATE STEPPING FOR GRAPHICS AND PLATFORM PROCESSORS

(71) Applicant: NVIDIA Corporation, Santa Clara, CA (US)

(72) Inventors: Anthony Michael Tamasi, Los Gatos, CA (US); William Tsu, San Jose, CA (US); Colyn S. Case, Hyde Park, VT (US); David G. Reed, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/607,081

(22) Filed: Jan. 28, 2015

(65) Prior Publication Data

US 2015/0199822 A1    Jul. 16, 2015

Related U.S. Application Data

(63) Continuation of application No. 11/253,291, filed on Oct. 17, 2005, now abandoned.

(51) Int. Cl.
*G06F 3/00* (2006.01)
*G06F 9/00* (2006.01)
*G06T 7/20* (2006.01)
*G06T 1/20* (2006.01)

(52) U.S. Cl.
CPC .... *G06T 7/20* (2013.01); *G06T 1/20* (2013.01)

(58) Field of Classification Search
CPC .. G06F 1/3215; G09G 5/363; H04L 12/4013; Y02B 60/31
See application file for complete search history.

(56) References Cited

U.S. PATENT DOCUMENTS

| | | | |
|---|---|---|---|
| 4,203,107 A | 5/1980 | Lovercheck |
| 4,542,376 A | 9/1985 | Bass et al. |
| 5,142,366 A | 8/1992 | Brown et al. |
| 5,349,682 A | 9/1994 | Rosenberry |
| 5,541,646 A | 7/1996 | Huang |
| 5,566,325 A | 10/1996 | Bruce, II et al. |
| 5,615,376 A | 3/1997 | Ranganathan |
| 5,619,707 A | 4/1997 | Suboh |
| 5,678,065 A | 10/1997 | Lee et al. |

(Continued)

OTHER PUBLICATIONS

Non-Final Office Action mailed on Dec. 14, 2007 for U.S. Appl. No. 11/253,291, 15 pages.

(Continued)

*Primary Examiner* — Hyun Nam
(74) *Attorney, Agent, or Firm* — Kilpatrick Townsend & Stockton LLP

(57) ABSTRACT

Circuits, methods, and apparatus for modifying the data rate of a data bus. In a circuit having two processors coupled by a data bus, the processors each learn that the other is capable of operating at a modified data rate. The data rate is then changed to the modified rate. Each processor may learn of the other's capability by reading a vendor identification, for example from a vendor defined message stored on the other processor. Alternately, each processor may provide an instruction to the other to operate at the modified rate, for example by writing to the other processor's extended capability registers. In another circuit having two processors communicating over a bus, it is determined that both are capable of transmitting and receiving data at a modified data rate. An instruction is provided to one or both of the processors to transmit at the modified rate.

21 Claims, 12 Drawing Sheets

(56) References Cited

U.S. PATENT DOCUMENTS

| | | |
|---|---|---|
| 6,049,870 A | 4/2000 | Greaves |
| 6,104,222 A | 8/2000 | Embree |
| 6,114,987 A | 9/2000 | Bjornholt |
| 6,127,896 A | 10/2000 | Burzio |
| 6,185,693 B1 | 2/2001 | Garmire et al. |
| 6,341,355 B1 | 1/2002 | Rutherford et al. |
| 6,414,555 B2 | 7/2002 | Staszewski et al. |
| 6,463,013 B1 | 10/2002 | Liu et al. |
| 6,476,800 B2 | 11/2002 | Millman et al. |
| 6,529,083 B2 | 3/2003 | Fujita |
| 6,678,834 B1 | 1/2004 | Aihara et al. |
| 6,750,687 B1 | 6/2004 | Klecka, III |
| 6,870,531 B2 | 3/2005 | Lee et al. |
| 7,184,708 B1 | 2/2007 | Kwa et al. |
| 7,187,220 B1 | 3/2007 | Alben et al. |
| 7,315,957 B1 | 1/2008 | Wagner et al. |
| 2003/0229816 A1* | 12/2003 | Meynard ..................... 713/600 |
| 2004/0005885 A1 | 1/2004 | Kato et al. |
| 2005/0053179 A1 | 3/2005 | Knapp et al. |
| 2005/0278463 A1 | 12/2005 | Ando |
| 2006/0044219 A1 | 3/2006 | Kao et al. |
| 2007/0208964 A1 | 9/2007 | Sandon et al. |
| 2008/0049009 A1 | 2/2008 | Khodorkovsky |

OTHER PUBLICATIONS

Final Office Action mailed on Jul. 23, 2008 for U.S. Appl. No. 11/253,291, 16 pages.
Non-Final Office Action mailed on Jan. 6, 2009 for U.S. Appl. No. 11/253,291, 12 pages.
Final Office Action mailed on Jun. 24, 2009 for U.S. Appl. No. 11/253,291, 13 pages.
Non-Final Office Action mailed on Apr. 29, 2010 for U.S. Appl. No. 11/253,291, 10 pages.
Final Office Action mailed on Oct. 14, 2010 for U.S. Appl. No. 11/253,291, 14 pages.

\* cited by examiner

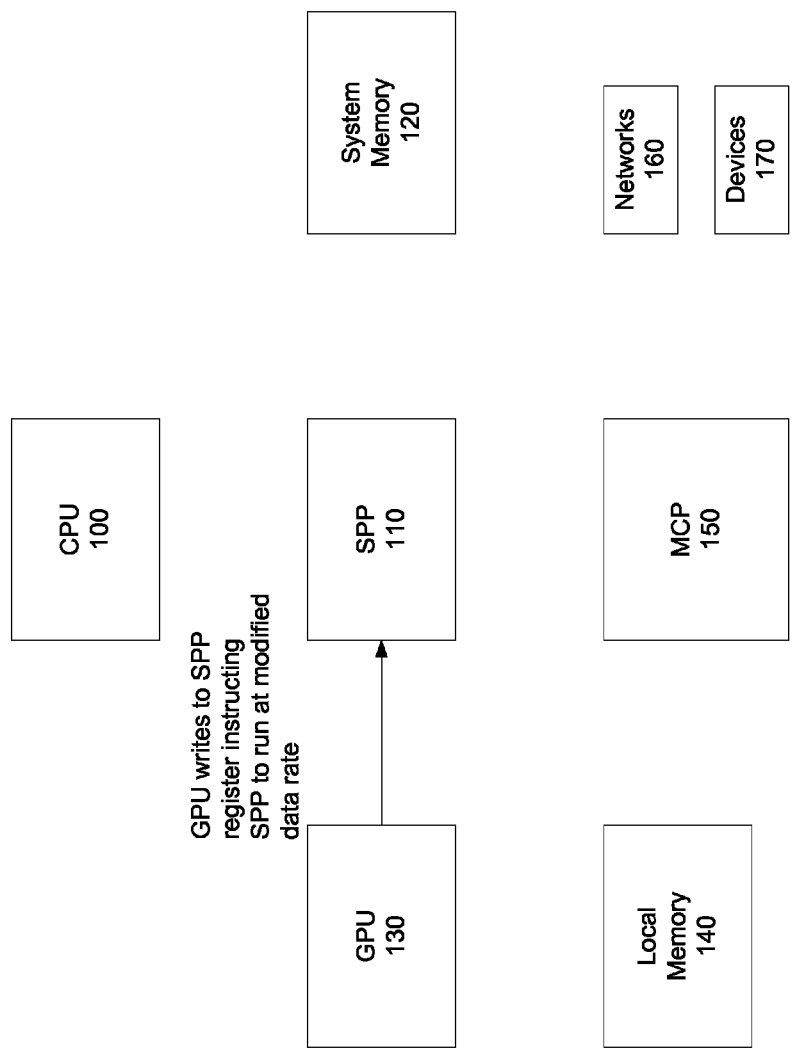

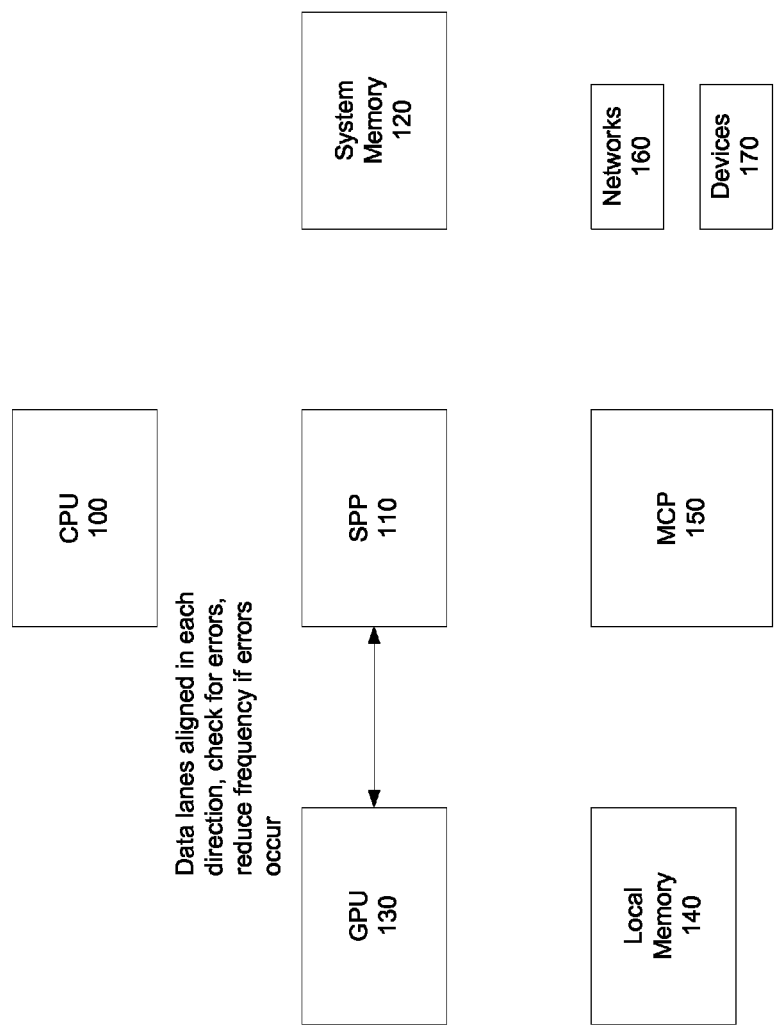

PCIE CLOCK RATE STEPPING FOR GRAPHICS AND PLATFORM PROCESSORS

CROSS-REFERENCES TO RELATED APPLICATIONS

This application is a continuation of U.S. patent application Ser. No. 11/253,291, filed Oct. 17, 2005, and is related to U.S. patent application Ser. No. 11/252,967 titled Memory Interface Clock Rate Stepping for Graphics and Platform Processors, which are incorporated by reference.

BACKGROUND

Embodiments of the present invention relate generally to transferring data over a data bus in computer systems, and more particularly to modifying the rate at which data is transferred over a computer system data bus.

The past few decades have seen an explosive increase in the performance capability of computer systems. The integrated circuits that give computers their computational power operate at ever increasing data rates. Some circuits, particularly graphics processors made by NVIDIA Corporation of Santa Clara, Calif., have become vastly more complex and orders of magnitude faster. Other circuits, such as central processing units, have become more complex and faster as well.

This increase in graphics processor power has long since out-stripped the ability of an advanced graphics port (AGP) bus to supply the data it needs. This bottleneck formed by the AGP bus has necessitated the use of ever-larger graphics memories that are apart from the system memory and dedicated to the graphics processor. This has been instrumental in leading to the development of an enhanced version of the peripheral component interconnect standard, referred to as PCIE.

But PCIE has its limitations and it is desirable to increase its data rate even further. NVIDIA Corporation is already a pioneer in developing PCIE technologies. Now what is needed are circuits, methods, and apparatus for modifying or increasing the rate at which data is transferred over a PCIE bus.

SUMMARY

Accordingly, embodiments of the present invention provide circuits, methods, and apparatus for modifying the rate at which data is transferred across a data bus. An exemplary embodiment of the present invention provides two processors coupled by a data bus. The processors each learn that the other is capable of operating at a modified data rate. The data rate is then changed to the modified rate. The processors may learn of the other's capability by reading a vendor identification, for example from a vendor defined message stored on the other processor. Alternately, the processors may provide an instruction to operate at the modified rate, for example, by writing to the other processor's extended capability registers. In other embodiments, a first processor, knowing that it can operate at a modified rate, learns that a second processor is capable of operating at a modified rate. The first then instructs the second to operate at the modified rate. Both processors then modify their data rate. In other embodiments, a first processor, knowing it can operate at a higher data rate, is capable of controlling a second processor's data rate. The first processor thus modifies the data rate of the second processor, as well as its own. This may be done by the first processor either directly, for example by changing a frequency of a clock provided by the first processor to the second processor, or indirectly, for example by having a BIOS instruct the second processor to modify its data rate.

Another embodiment provides for determining that two processors communicating over a bus are capable of transmitting and receiving data at a modified data rate. This may be done, for example, by a system BIOS operating on a CPU or other processor. An instruction to operate at a modified rate is provided to one or both of the processors. In various embodiments, the devices may agree to stop data transmission before modifying their data rate. This may be done once a period of low or no traffic is found. In other embodiments of the present invention, other mechanisms that maintain bus integrity during the data rate change can be used.

The processors may be a graphics processor unit, integrated graphics processor, system platform processor, media communications processor, digital media processor, or other processor developed by NVIDIA Corporation of Santa Clara, Calif. In other embodiments, other types of devices than processors may be used. In the embodiments shown, two devices share a bus, though in other embodiments there may be more than two devices sharing a bus or other connection.

The bus itself may be a PCIE bus, though embodiments of the present invention are not limited to this. For example, the bus may be compatible with other currently developed bus protocols. Also, other bus protocols are currently being developed, and others will be developed in the future, and these buses may be improved by incorporating embodiments of the present invention.

Buses that are improved by the incorporation of embodiments of the present invention may be point-to-point buses, such as a PCIE bus, or, again, they may be buses shared by more than two devices. Other point-to-point connections may also be improved by the incorporation of embodiments of the present invention. Embodiments may increase or otherwise modify a clock and related data rate to an associated memory at the same time. Embodiments may further provide for data alignment and error checking. Various embodiments may incorporate one or more of these or the other features described herein.

A typical embodiment of the present invention changes the data rate by changing an associated clock rate. Alternately, in other embodiments of the present invention, other techniques may be used separately or in combination to change the data rate. For example, the format of data packets or individual data bits may be changed.

A better understanding of the nature and advantages of the present invention may be gained with reference to the following detailed description and the accompanying drawings.

BRIEF DESCRIPTION OF THE DRAWINGS

FIGS. 5A-C illustrate data transfers between circuits according to the flowchart of FIG. 3;

DESCRIPTION OF EXEMPLARY EMBODIMENTS

Figure 1:
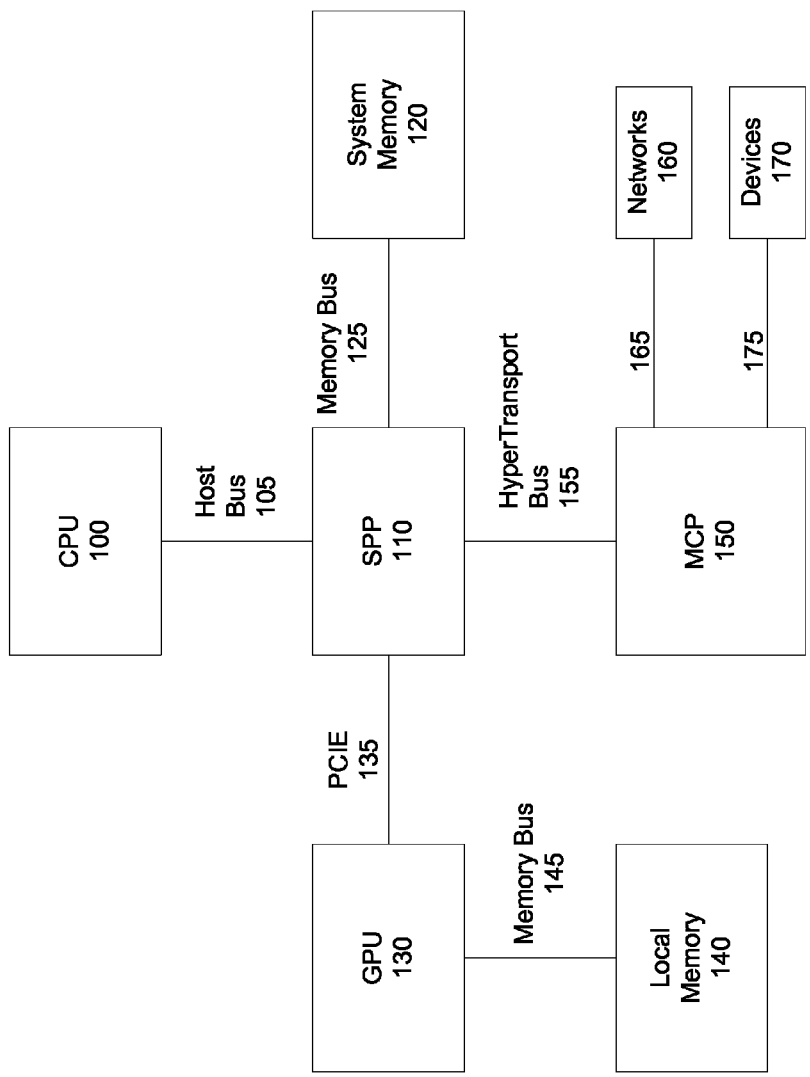
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, frame buffer, local, or graphics memory 140, media communications processor (MCP) 150, networks 160, and internal and peripheral devices 170. This figure, as with the other included figures, is shown for illustrative purposes only, and does not limit either the possible embodiments of the present invention, or the claims.

The CPU 100 connects to the SPP 110 over the host bus 105. The SPP 110 is in communication with the graphics processing unit 130 over an advanced graphics port (AGP) or peripheral component interconnect express (PCIE) bus 135. The SPP 110 reads and writes data to and from the system memory 120 over the memory bus 125. The MCP 150 communicates with the SPP 110 via a high-speed connection such as a HyperTransport bus 155, and connects network 160 and internal and peripheral devices 170 to the remainder of the computer system over lines 165 and 175, respectively. The graphics processing unit 130 receives data over the PCIE bus 135 and generates graphic and video images for display over a monitor or other display device (not shown). The graphics processing unit 130 may make use of a frame buffer or graphics memory 140—via the memory bus 145—as well as the system memory 120.

The CPU 100 may be a processor, such as those manufactured by Intel Corporation or Advanced Micro Devices, more likely the former, or other supplier, and are well-known by those skilled in the art. The SPP 110 and MCP 150 are commonly referred to as a chipset. The memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

Over the past several years, the processing capability of GPUs 110 and SPPs 150, particularly those manufactured by NVIDIA Corporation of Santa Clara, Calif., have increased tremendously. The processing capability of CPUs 100 has also increased, though to a lesser extent. The interface between the GPU 130 and SPP 110 has been improved by the use of PCIE circuits developed by NVIDIA Corporation of Santa Clara, Calif. However, NVIDIA's PCIE devices are capable of operating at a higher data rate than provided by the PCIE standard. Accordingly, embodiments of the present invention provide for modifying the data rate of the PCIE bus 135, for example by increasing the data rate to take advantage of this capability.

It is desirable to increase the data rate over the PCIE bus 135 when possible. In a specific embodiment of the present invention, this is done by each processor, in this example the GPU 130 and SPP 110, learning that the other is capable of transmitting and receiving data at a modified or higher data rate. Each device then operates at the modified or higher data rate.

In other embodiments of the present invention, one processor is capable of operating at a higher data rate and is capable of controlling the other's data rate. For example, the SPP 110 may provide a reference clock that sets the GPU's data rate. The SPP 110 may modify its data rate, as well as the reference clock's frequency, thus modifying the GPU's data rate as well. Alternately, one processor, such as the SPP 110, may provide or modify instructions that control the data rate at system initialization or configuration. In this case, the SPP 110 may have a system BIOS instruct the GPU 130 to modify its data rate. In still other embodiments of the present invention, one processor might unilaterally select a modified rate while the other processor attempts different rates until errors are eliminated.

Embodiments of the present invention may be used to modify the data are of the PCIE bus 135 between the SPP 110 and GPU 130. They may also be used to increase the or otherwise modify the data rate of the bus 155 between the SPP 110 and MCP 150, and this bus may be a HyperTransport bus, PCIE bus, or other types of bus. The other buses, such as the host bus 105, may also incorporate embodiments of the present invention.

While this embodiment provides a specific type computer system that may be improved by the incorporation of an embodiment of the present invention, other types of electronic or computer systems may also be improved. For example, video and other game systems, navigation, set-top boxes, and other types of systems may be improved by the incorporation of embodiments of the present invention.

Figure 2:
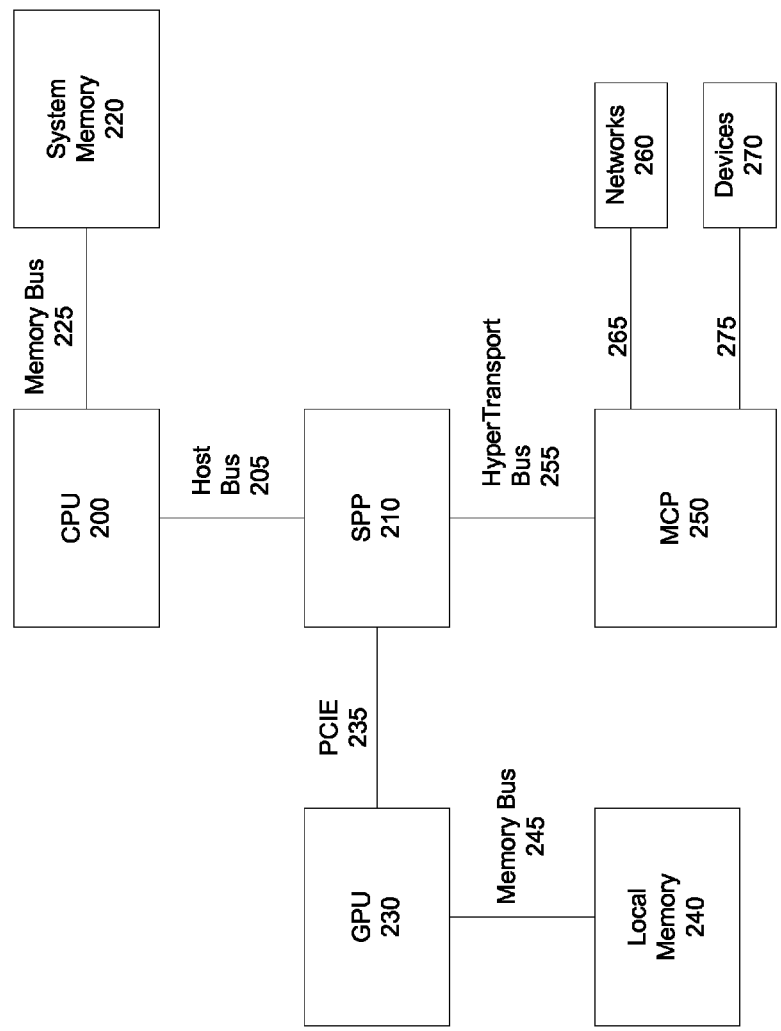
FIG. 2 is a block diagram of another computing system that is improved by incorporating an embodiment of the present invention.

FIG. 2 is a block diagram of another computing system that is improved by incorporating an embodiment of the present invention. This block diagram includes a central processing unit or host processor 200, SPP 210, system memory 220, graphics processing unit 230, frame buffer, local, or graphics memory 240, MCP 250, networks 260, and internal and peripheral devices 270.

The CPU 200 communicates with the SPP 210 via the host bus 205 and accesses the system memory 220 via the memory bus 225. The GPU 230 communicates with the SPP 210 over the PCIE bus 235 and the local memory over memory bus 245. The MCP 250 communicates with the SPP 210 via a high-speed connection such as a HyperTransport bus 255, and connects network 260 and internal and peripheral devices 270 to the remainder of the computer system over lines 265 and 275, respectively.

As before, the central processing unit or host processor 200 may be one of the central processing units manufactured by Intel Corporation or Advanced Micro Devices, more likely that latter, or other supplier, and are well-known by those skilled in the art. The graphics processor 230, system platform processor 210, and media and communications processor 240 are preferably provided by NVIDIA Corporation of Santa Clara, Calif. As before, the PCIE bus 235, as well as the other buses in this figure can be improved by the incorporation of embodiments of the present invention.

Figure 3:
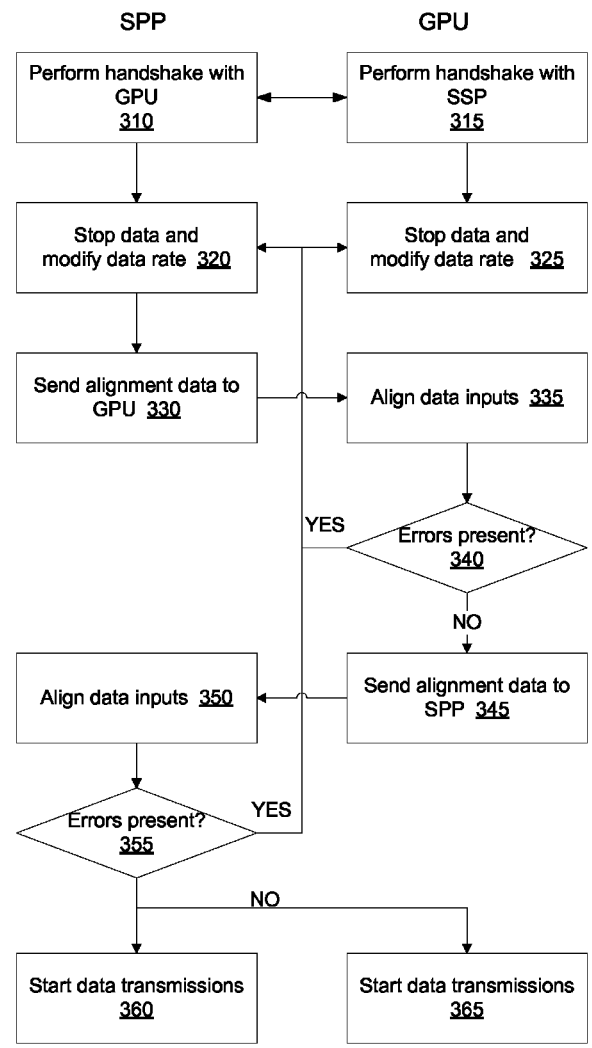
FIG. 3 is a flowchart illustrating a method of modifying the data rate of a data bus according to an embodiment of the present invention, where two devices sharing the data bus are responsible for modifying the data rate.

FIG. 3 is a flowchart illustrating a method of modifying the data rate of a data bus according to an embodiment of the present invention, where two processors sharing the data bus are responsible for modifying the data rate. In this particular example, the two processors are an SPP and GPU, such as the SPP 110 and 210 and GPU 130 and 230 in the above figures. In other embodiments, other processors or devices that are not processors may be used. In each flowchart, example circuits or software are listed in the header, and acts performed by each are in the column below the corresponding listing.

In act 310, the system platform processor sends one or more handshake signals to the graphics processing unit. In act 315, the graphics processing unit sends one or more handshake signals to the system platform processor. This handshaking allows each processor to determine that the other processor is capable of transmitting and receiving data at a modified or higher data rate. For example, this handshaking may allow each processor to determine that the other processor or device is an integrated circuit designed by NVIDIA Corporation of Santa Clara, Calif., and is a processor or other device capable of operating at the modified data rate. Examples of how this handshaking may be done are shown below in FIGS. 4A and 4B.

In act 320, the system platform processors stops transmitting data and modifies its data rate accordingly. In act 325, the graphics processing unit stops transmitting data and modifies its data rate. In various embodiments, handshaking steps that coordinate the stopping of data may be used. For example, a period of slow traffic may be identified. Once traffic slows or stops, each processor can, by signaling, agree to stop sending data for a set period of time. During this period, the processors can modify their data rate. The data rate may be modified by changing a divide ratio in a phase locked loop, for example, as shown below in FIG. 9.

Once the data rate is modified, the data inputs at the device bus interfaces may be aligned. In act 330, alignment data is sent from the system platform processor to the graphics processing unit. The GPU aligns its data inputs in act 335.

Embodiments of the present invention may optionally provide for an error checking, where when errors are detected during data alignment, the data rate is reduced. Also, if the data inputs cannot be properly aligned, the data rate is similarly reduced. In this way, situations are avoided in which a data rate is increased to the point where excess data transmission errors are created. Accordingly, in act 340, it is determined whether errors occur once the data inputs are aligned. If there are, the data rate may be lowered. If not, the GPU sends alignment data to the system platform processor in act 345. The system platform processor aligns its data inputs in act 350. Again, the presence of errors may be detected in act 355. If errors are detected, the data rate may be reduced. If errors are not detected, data transfers may begin between the system platform processor and the graphics processing unit, as indicated in acts 360 and 365.

In various embodiments, the presence of errors may be handled differently. In this example, if errors are detected in act 355, the data transmission rates for both the SPP and GPU are changed in response. In other embodiments of the present invention, since errors were not detected in act 340, the data rate for the SPP-to-GPU path is maintained, while the data rate for the GPU-to-SPP path is modified. In this embodiment, the data rate for the two directions may be asymmetrical. Also, if errors are detected in act 340, the SPP-to-GPU data rate may be lowered, while the GPU-to-SPP path data rate is maintained.

In this and the other examples, the ability of a first device to operate at a single modified data rate is determined by a second device, BIOS, or other hardware, software, or apparatus. In other embodiments of the present invention, the device may be able to transmit and receive data at more than one modified rate. In various embodiments, this ability may be determined by another circuit or software. This may be useful where devices sharing a bus may have different capabilities. For example, a first device may have the capacity to operate at a first and second modified data rate, while a second device is only capable of operating a the first modified data rate. In this case, when sharing a bus, the first and second devices can operate at the first modified data rate.

In this and other examples, for simplicity, the transmitting and receiving capability of each device is the same. In other embodiments of the present invention, these data rates may be unequal. In such a situation, the data rate over the bus may be different for each direction of data flow.

Also, in various embodiments of the present invention, the ability to operate at a modified clock or data rate may be the ability to operate at a higher rate. Alternately, it may be the ability to operate at a lower rate. It may also be the ability to operate at a higher data rate for the same clock rate. For example, the ability to operate at a modified data rate may be the ability to operate at a double data rate (DDR) instead of a single data rate (or at a single instead of a double data rate). Alternately, it may be the ability to operate at higher or lower multiple data rates. Some of these multiple data rates, such as DDR, may be common now, others may become common, or at least less rare, in the future.

In this and the other flowcharts, a specific flow is shown. In various embodiments, these acts may be performed in a variety of sequences. Any specific sequence is shown for exemplary purposes only, and does not limit either the possible embodiments of the present invention or the claims.

Figure 4A:
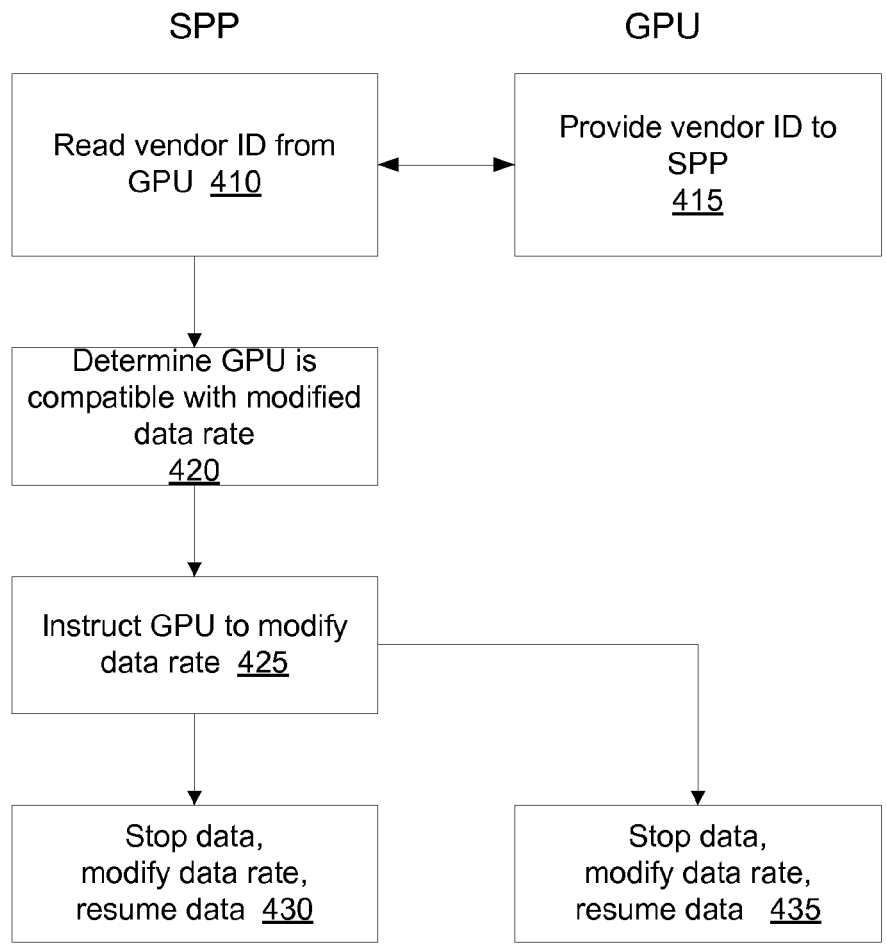
FIGS. 4A and 4B are handshaking methods that may be used by the devices in FIG. 3 and in other embodiments of the present invention.
Figure 4B:
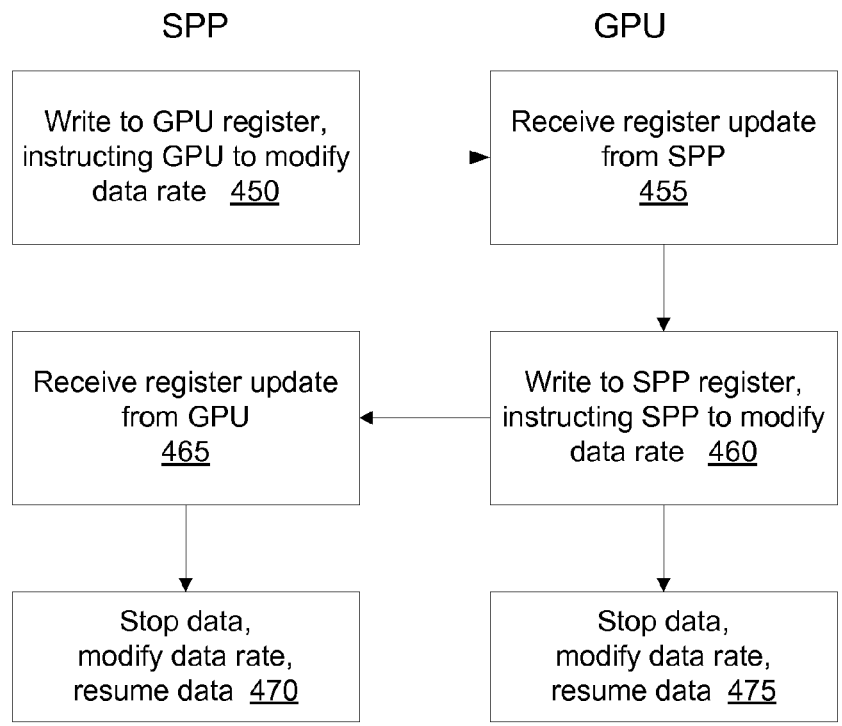

FIGS. 4A and 4B are handshaking methods that may be used by the processors in FIG. 3 and by other processors or other types of circuits in other embodiments of the present invention. In FIG. 4A, a first processor, knowing that it is compatible with a modified data rate, determines that a second processor on the bus is compatible with a modified data rate. Accordingly, the first processor modifies its data rate, and instructs the second processor to modify its data rate. Further handshaking, such as an acknowledge signal from the second processor to the first processor indicating that the data rate will be modified may be included. Again, in this example, a system platform processor and a graphics processing unit are shown, though in other embodiments, other processors or types of devices or integrated circuits that are not processors may be used.

Specifically, in act 410, a vendor identification is read from the graphics processing unit by the system platform processor. In act 415, the vendor identification is provided by the graphics processing unit to the system platform processor. In act 420, the system platform processor determines that the graphics processing unit is compatible with a modified data rate. For example, the system platform processor may determine that the graphics processing unit is compatible with a higher data rate.

The system platform processor already has knowledge that it is compatible with a modified data rate, so it instructs the GPU to increase or modify its data rate in act 425. In act 430, the system platform processor stops transmitting data and modifies its data rate, then resumes data transmission. Similarly, in act 435, the graphics processing unit stops transmitting data, modifies its data rate, and resumes transmitting data.

In this example, a vendor identification is used to determine compatibility with a modified data rate. In other embodiments of the present invention, this determination may be made in different ways. For example, other characteristics of the processor or environment can be used to determine compatibility with a higher or modified data rate.

FIG. 4B illustrates another handshaking method that may be used by various embodiments of the present invention. In this method, each processor or device understands that it is compatible with a modified data rate, and instructs the other processor to modify its data rate. Once a processor knows that is compatible with a modified data rate and has been instructed to modify its data rate, it modifies its data rate. Again, in this example, a system platform processor and graphics processing unit are shown as examples, though in other embodiments other processors or types of devices may be used.

Specifically, in act 450, the system platform processor writes to a register in the graphics processing unit instructing the graphics processing unit to increase its data rate. In act 455, the graphics processing unit receives this register update from the system platform processor. In act 460, the graphics processing unit writes to the system platform processor's register, instructing the system platform processor to increase its data rate. Accordingly, in act 465, the system platform processor receives the register update from the graphics processing unit. In acts 470 and 475, the data rate is modified by each device.

In this example, communication is done by writing to device registers. In other embodiments of the present invention, other forms of communication can be used. For example, signal level changes or flags can be used. Alternately, an in-memory instruction packet, interrupt, jumper change, or other method of communication may be used.

Figure 5A:
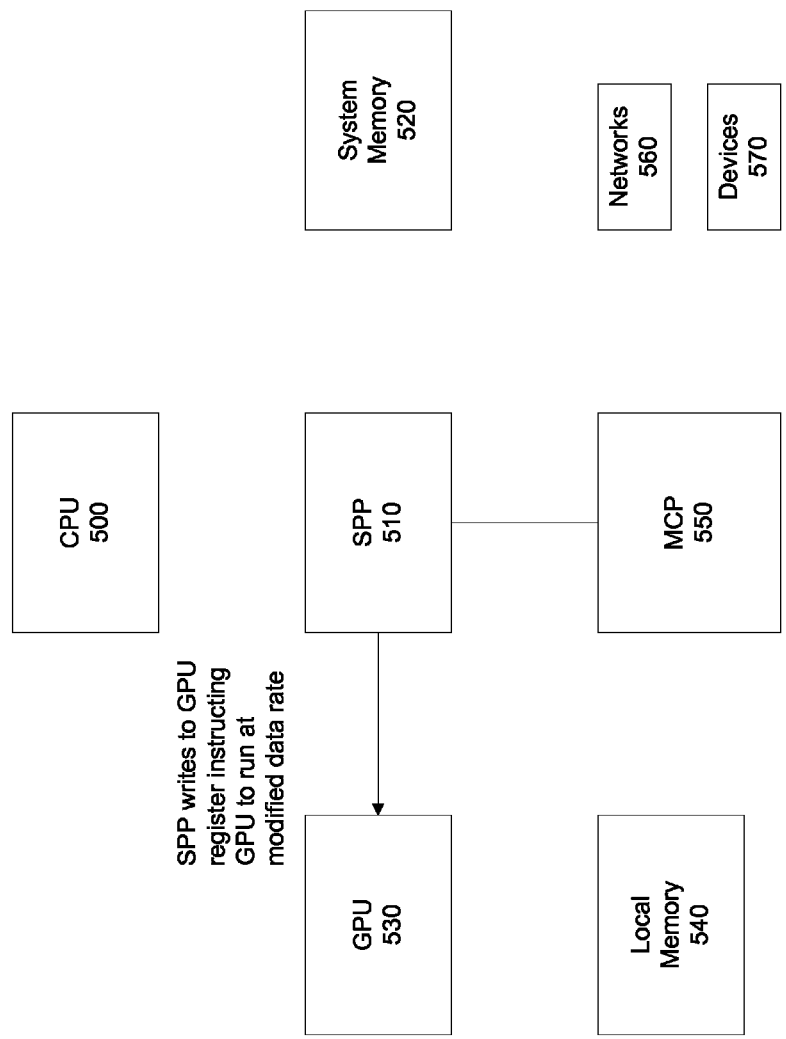

FIGS. 5A-C illustrate data transfers between circuits according to the flowchart of FIG. 3. In these figures, the system platform processor 510 knows that it is capable of operating at a modified data rate, and so instructs a graphics processing unit 530, with which it shares a data bus, to operate at this modified data rate. If the GPU 530 is capable of understanding this instruction, it returns an instruction to the system platform processor 510, instructing that processor to run at a higher data rate. Once each processor has been instructed to operate at a modified data rate, then it is known that both processors are capable of operating at the modified data rate. Accordingly, both processors modify their data rates across the shared bus.

In FIG. 5A, the system platform processor 510 writes to a GPU (not shown) register instructing the graphics processing unit 530 to operate at a modified data rate. The system platform processor 510 may, for example, write an instruction to an extended capability register located in the graphics processing unit 530.

In FIG. 5B, the GPU 530 writes to the system platform processor register (not shown) instructing the system platform processor 510 to run at a modified or higher data rate. Once each processor knows that it is capable of operating at a modified data rate and has been instructed by the other processor to operate at the higher data rate, each device can stop transmitting devices and increase or otherwise modify their data rate. The stopping of data may be facilitated by further handshaking signals, such as acknowledgment signals sent between the devices. In further embodiments, a period of low or no bus activity may be determined, and data rates changed at that time.

Again, embodiments of the present invention may provide for data alignment and error checking. In other embodiments, data is aligned, but transmission errors are not checked. In still other embodiments of the present invention, data is not aligned, but error checking is done, while in other embodiments, neither data alignment nor error checking is performed. In FIG. 5C, data lanes are aligned in each direction. Again, if errors are found, the frequency of operation can be reduced and the data lanes realigned. In various embodiments, when the data inputs cannot be properly aligned, the data rate is reduced.

Figure 6:
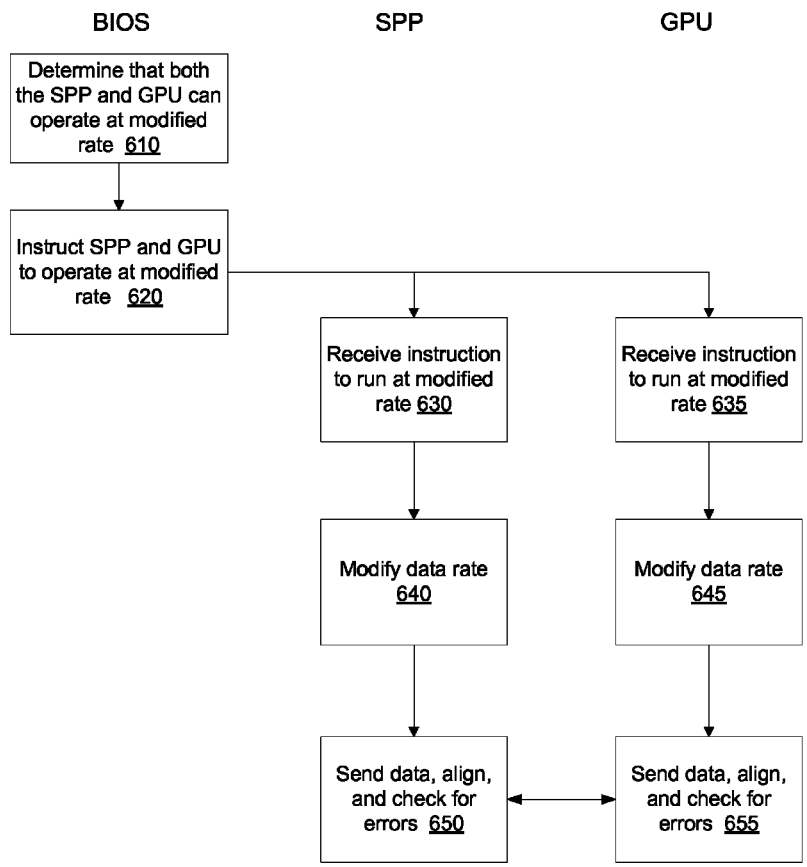
FIG. 6 is a flowchart illustrating a method of modifying the data rate of a data bus according to an embodiment of the present invention, where a system BIOS is responsible for modifying the data rate.

FIG. 6 is a flowchart illustrating a method of modifying the data rate of a data bus according to an embodiment of the present invention, where a basic input/output system (BIOS) is responsible for modifying the data rate. In this method, the BIOS determines that a system platform processor and graphics processing unit can operate at a modified or increased data rate. Accordingly, each device is instructed to run at the higher or modified data rate. As before, in this example, a system platform processor and graphics processing unit are shown. In other embodiments, other types of processors or other types of devices that are not processors may be used.

Specifically, in act 610, the BIOS determines that both the system platform processor and graphics processing unit are capable of operating at a higher or modified data rate. Accordingly, in act 620, the BIOS instructs the system platform processor and graphics processing unit to operate at the modified data rate. In act 630, the system platform processor receives an instruction to operate at the higher data rate, while in act 635, a graphics processing unit receives this instruction. In act 640, the system platform processor modifies its data rate, while in act 645, the graphics processing unit modifies its data rate.

Typically, these acts occur at power-up, before data is transferred across the data bus. Accordingly, data typically does not have to be stopped before the data rate is modified. In some embodiments however, data needs to be stopped before the data rates are changed. In this case, further handshake signals where the devices agree to stop transmitting data may be useful. In acts 650 and 655, data can be sent, inputs aligned, and errors checked for. Again, if errors are found, the data rate across the bus may be reduced as needed.

In many embodiments of the present invention, each device sharing a bus is manufactured by NVIDIA Corporation of Santa Clara, Calif. In other embodiments, only one processor is an NVIDIA device, or only one is an NVIDIA device having the capabilities outlined. In these situations, the NVIDIA device may control the data rate of the other device either directly or indirectly. For example, a first processor may provide a reference clock to a second processor. The first processor, knowing it is capable of operating at a modified data rate, switches to that data rate and changes the reference clock as well. Alternately, the first processor may instruct a system BIOS to in turn instruct the second (and possibly first) processor to operate at the higher data rate. These concepts can be extended to situations where a data rate a memory interface is also modified. Examples are shown in the next two figures.

Figure 7:
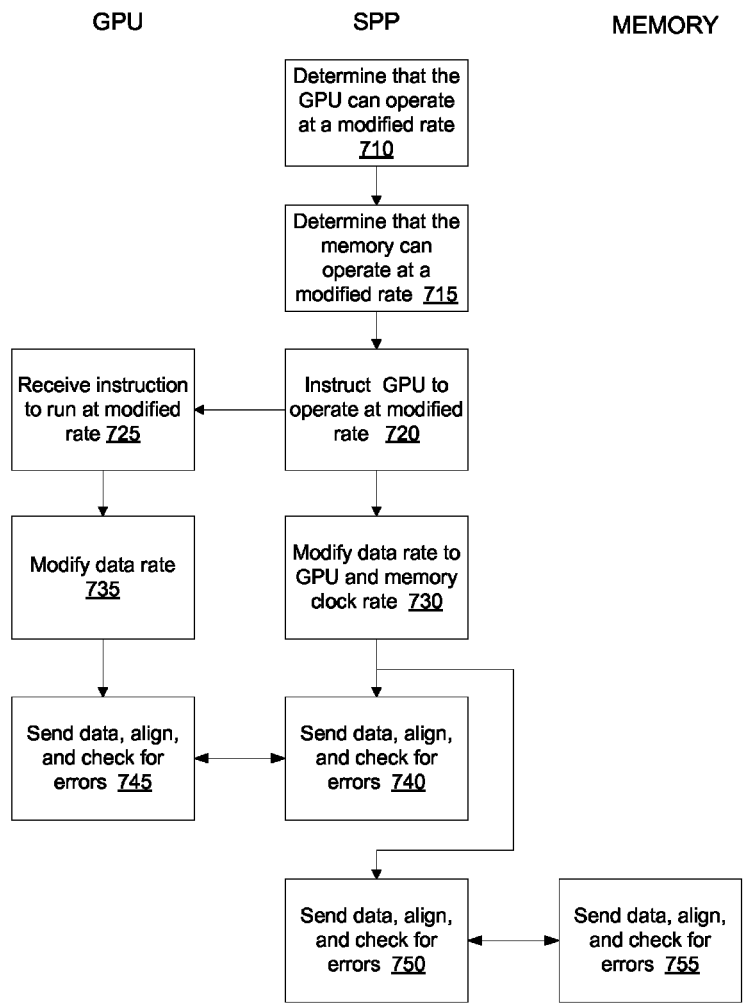
FIG. 7 is a flowchart illustrating a method of modifying the data rate of a data bus and a memory interface according to an embodiment of the present invention, where two processors sharing the data bus are responsible for modifying the data rate of the bus, and one is responsible for modifying the data rate of the memory interface.

FIG. 7 is a flowchart illustrating a method of modifying the data rate of a data bus and a memory interface according to an embodiment of the present invention, where two processors sharing the data bus are responsible for modifying the data rate of the bus, and one is responsible for modifying the data rate of the memory interface.

In act 710, and the system platform processor determines that the graphics processing unit is capable of operating at a modified data rate. In act 715, it is determined that the memory can also operate at a higher data rate. Accordingly, in act 720, the system platform processor instructs the GPU to operate at a higher or otherwise modified data rate. In this particular example, a specific handshake methodology is shown. In other embodiments, other handshaking, such as the handshaking shown in the other figures may be used. In other embodiments of the present invention, other handshaking methodologies may be used.

In act 725, the graphics processing unit receives this instruction. Accordingly, in acts 730 and 735 the data rate across the data bus between the graphics processing unit and system platform processor is increased or otherwise modified. Similarly, the memory clock rate is increased or otherwise modified by the system platform processor. Again, in various embodiments of the present invention, data transfers are stopped before the data rates are changed. Accordingly, further handshaking signals indicating when data transfers are to be stopped may be useful.

In acts 740 and 745, data is sent across the bus connecting the graphics processing unit and the system platform processor, data inputs are aligned, and errors are checked for. In acts 750 and 755, data is sent across the memory bus between the system platform processor and the memory, data inputs are aligned, and errors are checked for. In a specific embodiment of the present invention, the memory interface is a double data rate (DDR) memory interface. In other embodiments of the present invention, other types of memory interfaces may be used. Methods, circuits, and apparatus that may be used for increasing or modifying the clock and data rate across the memory bus can be found in co-pending U.S. patent application Ser. No. 11/252,967, titled Memory Interface Clock Rate Stepping for Graphics and Platform Processors, which is incorporated by reference.

Figure 8:
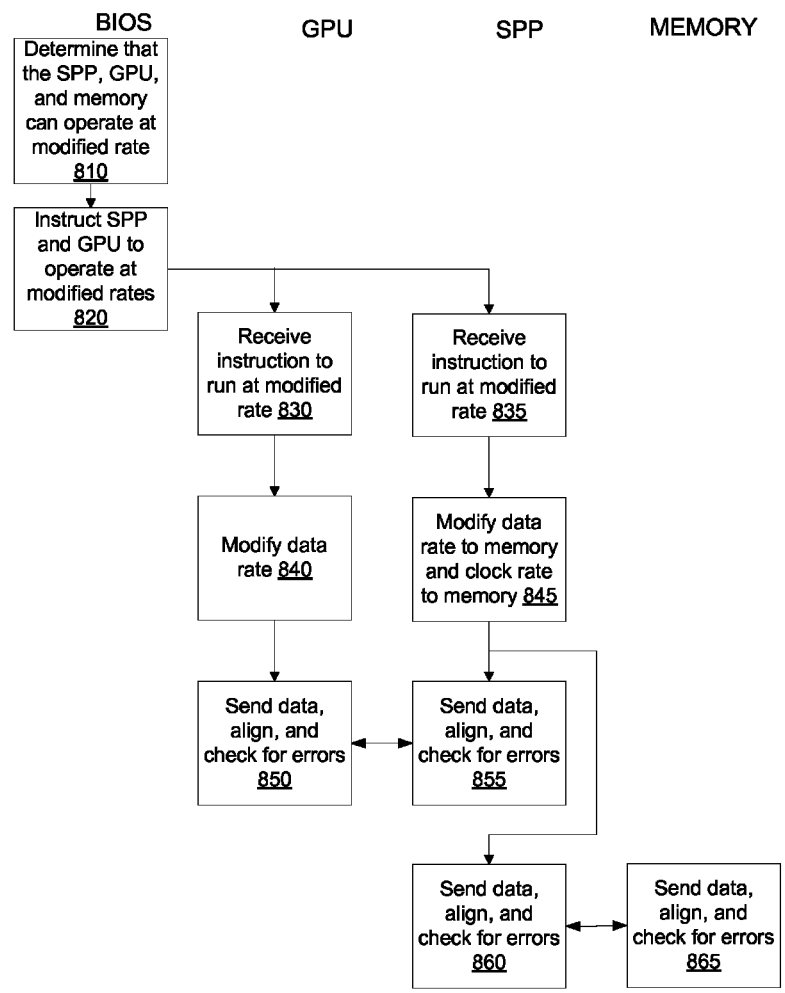
FIG. 8 is a flowchart illustrating a method of modifying the data rate of a data bus according to an embodiment of the present invention, where a system BIOS is responsible for modifying the data rates of the bus and memory interface.

FIG. 8 is a flowchart illustrating a method of modifying the data rate of a data bus according to an embodiment of the present invention, where a system BIOS is responsible for modifying the data rates of the bus and memory interface. In act 810, the BIOS determines that the system platform processor, graphics processing unit, and memory, can each operate at a higher or otherwise modified data rate. Accordingly, in act 820, the BIOS instructs the system platform processor and graphics processing unit to operate at the higher or modified data rate.

In acts 830 and 835, this instruction is received by the graphics processing unit and system platform processor. Accordingly, in act 840, the graphics processing unit modifies the data rate over the bus that it shares with the system platform processor. In act 845, the system platform processor modifies the data rate over the shared bus as well as the clock rate to the memory.

In act 855 data is sent across the data bus shared by graphics processing unit and the system platform processor. The data inputs are aligned and errors are checked for. In acts 860 and 865, data is sent across the memory interface connecting the system platform processor to the memory. The data inputs are aligned and errors are checked for.

As before, the presence of errors after alignment may cause a reduction in data rates. Further, in some embodiments of the present invention, it is desirable to maintain a specific ratio of data rates between the data bus between the SPP and GPU and memory interface bus between the SPP and memory. In this case, the reduction in rate across one bus may result in a reduced data rate in the other.

In this and other examples, the BIOS determines data rate compatibility of various processors or other devices. This BIOS typically runs on a CPU such as the CPUs 100 and 200 in FIGS. 1 and 2. In other embodiments of the present invention, other software, hardware, or apparatus may be used to make this determination. The BIOS or other software, hardware, or apparatus may make this determination at device power-up, power reset, or at any other appropriate time. For example, when a high volume of traffic is detected, this determination and a subsequent data rate increase may be used to alleviate the condition.

Figure 9:
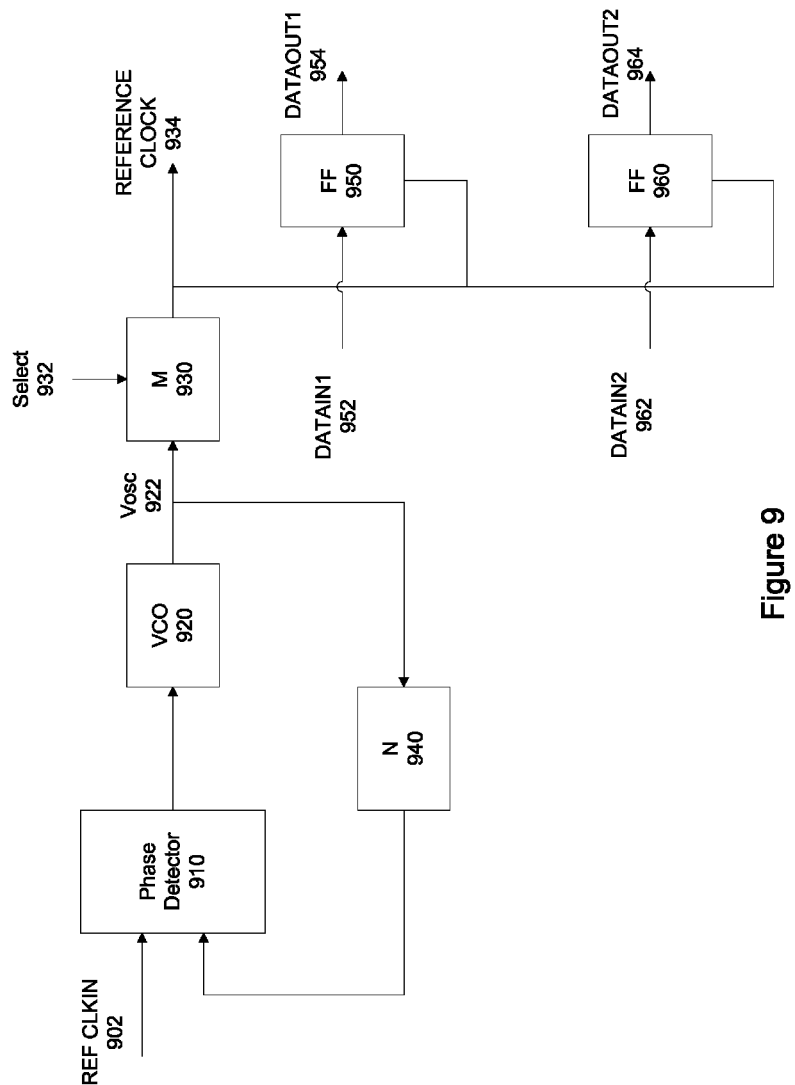
FIG. 9 is a block diagram of a phase-locked loop and related circuitry at a PCIE data bus interface consistent with an embodiment of the present invention.

FIG. 9 is a block diagram of a phase-locked loop and related circuitry at a PCIE interface consistent with an embodiment of the present invention. This figure includes a phase-locked loop having a phase detector 910, voltage controlled oscillator (VCO) 920, and divider 940, as well as a frequency divider 930, clock retiming circuit 950, and data retiming circuit 960.

A periodic reference clock or other reference signal is received on line 902 by phase detector 910. The phase detector 910 compares the phase of the signal on line 902 to the output of the divider 940, and provides a control signal to the voltage-controlled oscillator 920. In various embodiments, the output of the phase detector 910 may be received by a charge pump, the output of which is filtered by a loop filter before being received by the voltage-controlled oscillator 920. The voltage-controlled oscillator 920 provides an output Vosc on line 922. This signal has a frequency that is "N" times the frequency of the reference clock received on line 902, where "N" is the divide ratio of the divider 940. In various embodiments, the value "N" for the divider 940 may be programmable or otherwise variable.

The output of the VCO 920 is divided by a second value "M." The ratio "M" is variable, in this example under the control of one or more selects lines 932. For example, for a higher data rate, the divide ratio "M" of divider 930 may be set to an appropriate low value, while it's set to a higher value for a lower data rate. In other embodiments, both the divide ratios "N" and "M" may be varied to control the data rate.

Retiming circuits 950 and 960 retime data signals datain1 952 and datain2 962 to generate data output signals on lines 954 and 964. In various data bus interfaces, there may be various numbers of data outputs generated by one or more phase-locked loops, the outputs of which are divided by one or more dividers. It will be appreciated by one skilled in the art that this circuit is representative of many that may be used to generate a data signals for transmission onto a data bus.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of modifying a data rate used in communications between a first processor and a second processor via a bus, the method comprising:

sending, from the first processor, a first handshake signal to the second processor via the bus;

receiving, by the second processor, the first handshake signal from the first processor via the bus;

sending, from the second processor, a second handshake signal to the first processor via the bus;

receiving, by the first processor, the second handshake signal from the second processor via the bus;

determining, by the first processor, based on the received second handshake signal, that the second processor is capable of transmitting data via the bus at a first modified data rate;

determining, by the second processor, based on the received first handshake signal, that the first processor is capable of transmitting data via the bus at a second modified data rate;

instructing, by the first processor, the second processor to change a data rate at which the second processor transmits data via the bus to the first modified data rate;

instructing, by the second processor, the first processor to change a data rate at which the first processor transmits data via the bus to the second modified data rate;

changing, by the first processor, based on the received instruction from the second processor, the data rate at which the first processor transmits data via the bus to the second modified data rate; and changing, by the second processor, based on the received instruction from the first processor, the data rate at which the second processor transmits data via the bus to the first modified data rate.

2. The method of claim 1 wherein the first data rate and the second data rate are the same data rate.

3. The method of claim 1 wherein the first data rate and the second data rate are different data rates.

4. The method of claim 1 wherein the first handshake signal comprises a vendor identification.

5. The method of claim 1 wherein the determining, by the first processor, based on the received second handshake signal, that the second processor is capable of transmitting data via the bus at a first modified data rate further comprises determining, by the first processor, based on the received second handshake signal, that the second processor is also capable of transmitting data via the bus at a third modified data rate.

6. The method of claim 1 further comprising:
determining, by the first processor, that a memory is capable of receiving data at a third modified data rate; and
changing, by the first processor, a data rate at which the first processor transmits data to the memory to the third modified data rate.

7. The method of claim 1 wherein the instructing, by the first processor, the second processor to change a data rate at which the second processor transmits data via the bus is done by the first processor writing an entry into a register in the second processor.

8. The method of claim 7 wherein the register in the second processor is an extended capabilities register.

9. The method of claim 1 wherein the instructing, by the first processor, the second processor to change a data rate at which the second processor transmits data via the bus is done by the first processor instructing a Basic Input/Output System (BIOS) to have the second processor change the data rate at which the second processor transmits data via the bus.

10. The method of claim 1 wherein the first processor is a graphics processing unit and the second processor is a system platform processor.

11. The method of claim 1 wherein the first processor is a graphics processing unit and the second processor is another graphics processing unit.

12. A method of increasing a data rate used in communications between a first processor and a second processor via a bus, the method comprising:
sending, from the first processor, a request for data to the second processor via the bus;
receiving, by the second processor, the request for data from the first processor via the bus;
sending, from the second processor, the requested data to the first processor via the bus;
receiving, by the first processor, the requested data from the second processor via the bus;
determining, by the first processor, based on the received data, that the second processor is capable of transmitting data via the bus at a first increased data rate;
instructing, by the first processor, the second processor to change a data rate at which the second processor transmits data via the bus to the first increased data rate;
changing, by the first processor, the data rate at which the first processor transmits data via the bus to a second increased data rate; and
changing, by the second processor, based on the received instruction from the first processor, the data rate at which the second processor transmits data via the bus to the first increased data rate.

13. The method of claim 12 wherein the first data rate and the second data rate are the same data rate.

14. The method of claim 12 wherein the first data rate and the second data rate are different data rates.

15. The method of claim 12 wherein the requested data comprises a vendor identification.

16. The method of claim 12 further comprising:
determining, by the first processor, that a memory is capable of receiving data at a third modified data rate; and
changing, by the first processor, a data rate at which the first processor transmits data to the memory to the third modified data rate.

17. The method of claim 12 wherein the instructing, by the first processor, the second processor to change a data rate at which the second processor transmits data via the bus is done by the first processor writing an entry into a register in the second processor,
wherein the register in the second processor is an extended capabilities register.

18. The method of claim 12 wherein the instructing, by the first processor, the second processor to change a data rate at which the second processor transmits data via the bus is done by the first processor instructing a Basic Input/Output System (BIOS) to have the second processor change the data rate at which the second processor transmits data via the bus.

19. A method of modifying a data rate used in communications between a first processor and a second processor via a bus, the method comprising:
determining, by a Basic Input/Output System (BIOS), that the first processor is capable of transmitting data via the bus at a first modified data rate;
determining, by the BIOS, that the second processor is capable of transmitting data via the bus at the first modified data rate;
instructing, by the BIOS, the first processor to change a data rate at which the first processor transmits data via the bus, where the data rate is to be changed to the first modified data rate;
instructing, by the BIOS, the second processor to change a data rate at which the second processor transmits data via the bus, where the data rate is to be changed to the first modified data rate;
changing, by the first processor, based on the instruction received by the first processor from the BIOS, the data rate at which the first processor transmits data via the bus to the first modified data rate; and
changing, by the second processor, based on the instruction received by the second processor from the BIOS, the data rate at which the second processor transmits data via the bus to the first modified data rate.

20. The method of claim 19 wherein the BIOS instructs the first processor to change a data rate at which the first processor transmits data via the bus is done by writing an entry into a register in the first processor, wherein the register in the first processor is an extended capabilities register.

21. The method of claim 19 wherein the first processor is a graphics processing unit and the second processor is another graphics processing unit.

* * * * *